Dec. 3, 1929.  J. F. O'CONNOR  1,737,612
BRAKE
Filed Aug. 29, 1924
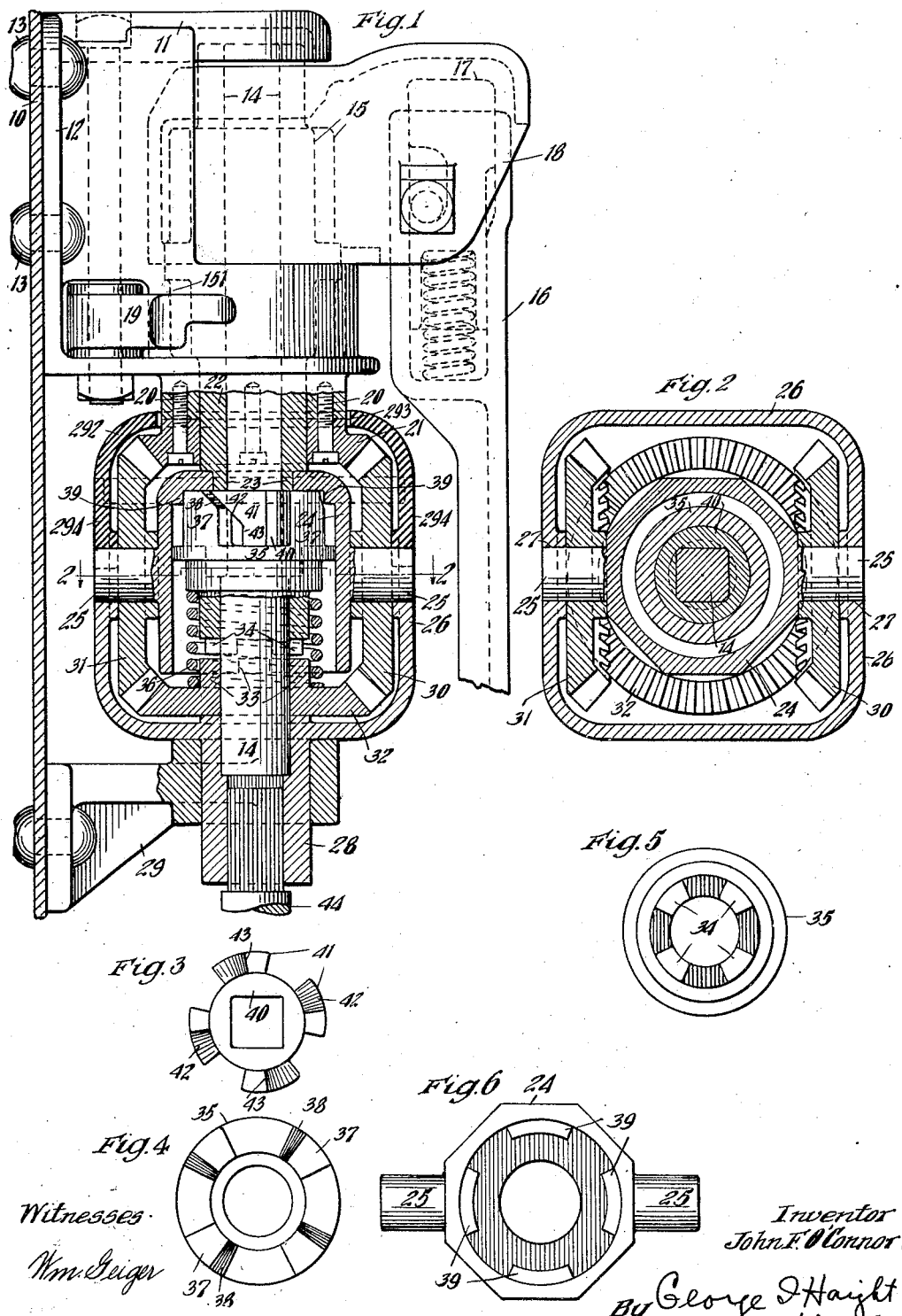
Witnesses
Wm. Geiger
Inventor
John F. O'Connor
By George I. Haight
His Atty.

Patented Dec. 3, 1929

1,737,612

UNITED STATES PATENT OFFICE

JOHN F. O'CONNOR, OF CHICAGO, ILLINOIS, ASSIGNOR, BY MESNE ASSIGNMENTS, TO W. H. MINER, INC., A CORPORATION OF DELAWARE

BRAKE

Application filed August 29, 1924. Serial No. 734,832.

This invention relates to brakes.

One object of the invention is to provide a hand brake for railway and other vehicles having means for quickly taking up the slack in the brake chain, and then automatically increasing the leverage ratio pull on the brake chain during the final application of the braking pressure.

Another object of my invention is to provide a brake of this character, provided with a tightening element, in conjunction with a plurality of transmitting means, one of which is a planetary gear arrangement, and a clutch mechanism arranged to be moved into engagement with one or the other of said transmitting means, the operation of said clutch mechanism being automatically accomplished by encountering increased resistance on the tightening element.

Other and further objects of the invention will more fully and clearly appear from the description and claims hereinafter following.

Referring to the drawing forming a part of this specification, Figure 1 is a vertical sectional view of the invention, partly in elevation, showing the same applied to a railway car. Figure 2 is a sectional view of the invention on the line 2—2 of Figure 1. Figure 3 is a bottom plan view of a driving member used in connection with my invention. Figure 4 is a top plan view of a movable clutch element utilized in connection with my invention. Figure 5 is a bottom plan view of such clutch element. And Figure 6 is a bottom plan view of a connecting member forming part of my invention.

Referring to the drawing, 10 indicates an end wall of a railway car to which the brake is adapted to be secured. My invention preferably includes mechanism for actuating the brake staff which comprises a housing 11 provided with flanges 12, which are secured to the wall 10 by means of rivets 13 or other suitable fastening means. Rotatably mounted in such housing is a brake staff 14, upon which is secured a ratchet wheel 15, such ratchet wheel being adapted to be rotated by means of an actuating device including an operating lever 16 having a spring pressed pawl 17 associated therewith, such lever being pivotally connected adjacent its end to a carrier 18, which is disposed about the staff 14, the arrangement being such that the lever 16 normally hangs in depending inoperative position. When it is desired to rotate the staff 14, the lever is swung upwardly, causing the engagement of the pawl 17 with the ratchet 15, whereupon oscillation of such lever effects rotation of the staff 14 in a clockwise direction. Retrograde movement of the ratchet wheel 15 is prevented by a preferably spring controlled pawl (not shown), connected to a release lever 19, which pawl engages the ratchet wheel 151 rigid with and located below the ratchet wheel 15. In release the lever 16 is first allowed to assume its depending position, and the lever 19 is operated to disengage the pawl connected therewith, so that the staff 14 is then free to unwind in a counterclockwise direction. Although I prefer to use staff operating mechanism of the characted described, other suitable means for rotating such staff may be utilized in connection with the transmitting mechanism which will now be referred to.

The transmitting mechanism contemplated by my invention includes a stationary member in the form of a beveled gear 21, which is preferably secured to the under surface of the housing 11 by means of screw bolts 20, or other securing means, such gear facing outwardly and downwardly, and being disposed about a sleeve 22 forming an extension of the ratchet wheels 15 and 151 extending through and beyond the gear 21, such sleeve being provided with a reduced portion 23 on its lower end. Rotatably mounted upon the reduced portion 23 of the sleeve 22 is the upper end portion of an inverted cup-shaped connecting member 24, said member being provided with trunnions 25, which extend outwardly therefrom, and are adapted to be secured to a supporting member, which is preferably in the form of an outer two part housing as shown. Such housing comprises a hollow body portion 26, having oppositely disposed vertical slots 27 extending from its upper edges downwardly a suitable distance, such slots being arranged to receive the trunnions 25 of the connecting member 24 snugly therein. The lower end of the body portion 26 is provided with an integral sleeve 28 rotatably mounted in a bracket 29, which is secured to the wall 10 of the car by suitable fastening means, the bottom portion 26 of such housing bearing against, and being supported upon the bracket 29. The housing also includes a cap 292 for closing the same, the cap being provided with an aperture 293 in its top the wall of which fits loosely about the neck of the gear 21. Such cap also preferably has its lower edges rabbeted to engage the correspondingly rabbeted upper edges of the body portion 26. The cap 292 also includes extensions 294 which project into and fill the slots 27, the inner ends of such extensions being curved to fit about the trunnions 25, thereby completely closing the housing, except for the aperture 293 in the top of the cap.

Beveled gears 30 and 31 are rotatably mounted on the trunnions 25, and are arranged to mesh with the gear 21, and with another beveled gear 32, disposed within said housing, and normally resting against the bottom thereof. The gear 32 is loosely journaled on the staff 14, which extends through the housing 26, and terminates in the sleeve 28 of such housing as shown.

The inner side of the gear 32 is provided with a plurality of clutch members in the form of teeth 33, adapted to cooperate with clutch members 34 formed on the lower end of a shiftable clutch device 35, there being a spring 36 interposed between the gear 32 and the clutch device 35 for normally holding the clutch members 34 out of engagement with the clutch members 33 on the gear 32. The upper portion of the clutch device 35 is provided with a plurality of clutch extensions or members 37, each of which has an inclined portion 38 on its rear face, the forward face of each clutch extension 37 being vertically disposed and arranged to normally bear against the straight faces of clutch portions 39 formed on the inner surface of the connecting member 24, as shown. A driving member 40 is secured to the staff 14 (which at this point and upwardly therefrom to the top is of square cross section) in position to cooperate with the clutch device 35, such driving member being provided with a plurality of radial driving lugs 41, each of which has its upper forward face 42 inclined, and its lower forward face 43 vertically disposed, such driving lugs being arranged to engage the clutch extensions 37 of the clutch device 35, but being free of the clutch portions 39. It should be noted that the terms "forward" and "rear" as employed herein indicate respectively, the advancing and retreating faces of the various members, assuming rotation of the staff 14 in a clockwise direction.

The housing 26 is connected to a winding drum, not shown, by means of a shaft or staff extension 44, the inner end of which has a squared portion fitting into a corresponding socket formed in the sleeve 28 of the housing 26, so that rotation of said housing is directly communicated to the winding drum.

In operation, when the staff 14 is rotated in a clockwise direction, the movement is transmitted through the medium of the driving lugs 41 to the extensions 37 of the clutch device, and thence to the clutch portions 39 of the connecting member 24, such movement being further transmitted by the connecting member to the housing 24 to impart rotation thereto, which in turn causes rotation of the sleeve 28, the shaft 44, and the winding drum connected therewith. Upon a predetermined resistance being encountered, that is, when the slack of the brake chain has been taken up, the inclined faces 42 of the driving lugs 41 bearing upon the inclined portions 38 of the clutch extensions 37, cause the clutch device to move downwardly and out of engagement with the clutch portions 39 of the connecting member. This movement brings about the engagement of the clutch members 34 on the lower end of the clutch device, with the clutch member 33 on the upper face of the gear 32, the straight faces 43 of the driving lugs in this position of the parts having a positive driving engagement with the clutch extensions 37. The rotation of the staff 14 is now transmitted to the gear 32, rotating the gears 30 and 31 which are in mesh with the stationary gear 21, thereby causing the gears 30 and 31 to travel around the stationary gear 21, corresponding movement being imparted to the housing and winding drum, the speed of movement of the housing being decreased one half, and the power ratio correspondingly doubled, when gears of the sizes shown are used. Retrograde movement of the staff is prevented as above described. When the staff is released the parts will assume their normal position under the influence of the spring 36, as will be readily understood.

By this arrangement, it will be seen that during the initial winding of the brake drum to take up the slack, I provide transmitting means affording a direct transmission of the power imparted to the staff 14, to the shaft 44, leading to the winding drum, and upon a predetermined resistance being encountered, driving movement is transferred to other transmitting means in the form of a planetary gear arrangement through the medium of an automatically operable clutch mechanism, whereby the power ratio is greatly increased. It should also be observed that the clutch mechanism is of such a character that during the initial rotation of the staff, the clutch device is resiliently held in engagement with the clutch portions 39, and in addition the straight faces of the clutch portions 39 and clutch extensions 37 effect a frictional engagement, so that the clutch is not moved by the inclined faces 42 of the driving member until considerable resistance has developed. When the clutch has been shifted it will be appreciated that the straight faces 43 of the driving lugs, engaging the adjacent straight faces of the extensions 37, afford a positive driving connection therebetween. Attention is also called to the fact that the travel of the clutch member, due to the length of the inclined faces of the driving lugs 41 is such that the clutch teeth of the cooperating transmitting members are completely disengaged so as to prevent any dragging or interference therebetween during the operation of the device.

I have herein shown and described what I now consider the preferred manner of carrying out my invention, but the same is merely illustrative and I contemplate all changes and modifications that come within the scope of the claims appended hereto.

I claim:

1. In a brake mechanism, the combination with a tightening element; of a plurality of transmitting means cooperating with said tightening element, one of said transmitting means being in the form of a planetary system; rotary clutch device arranged for connection with either of said transmitting means; and means for rotating said clutch device, including means for automatically shifting the clutch device upon said clutch device encountering a predetermined resistance.

2. In a brake mechanism, the combination with a tightening element; of a plurality of transmitting means cooperating with said tightening element, and having different ratios, one of said transmitting means being in the form of a planetary system; a clutch device arranged for connection with either of said transmitting means; means arranged to automatically shift said clutch device from one transmitting means to another; and driving means having a positive driving connection with said clutch device in its shifted position.

3. In a brake mechanism, the combination with a tightening element; of a plurality of transmitting means cooperating with said tightening element, one of said transmitting means being in the form of a planetary system; a clutch device arranged for connection with either of said transmitting means; means for shifting said clutch device from one to the other of said transmitting means, said shifting means serving to move said clutch device clear of the transmitting means from which it is disengaged.

4. In a brake mechanism, the combination with a tightening element; of a plurality of transmitting means cooperating with said tightening element, one of said means being in the form of a planetary system, each of said transmitting means having connecting elements associated therewith; a clutch device having means adapted to engage the connecting elements of said transmitting means; and driving means free of said connecting elements and arranged to engage said clutch device to drive the same.

5. In a brake mechanism, the combination with a tightening element; of a plurality of transmitting means cooperating with said tightening element, one of said means being in the form of a planetary system, each of said transmitting means having connecting elements associated therewith; a clutch device having means adapted to engage the connecting elements of either of said transmitting means; and means free of said connecting elements and arranged to engage said clutch device to shift the same, and drive the said device in its various positions.

6. In a brake mechanism, the combination with a tightening element; of a supporting member connected with said element; power multiplying planetary gearing operatively connected with said supporting member; a connecting member free of said planetary power multiplying gearing and connected to said supporting member; driving means shiftable into operative engagement with said power multiplying gearing or said connecting member; and means for automatically shifting said driving means upon increased resistance being offered to the operation of the tightening element.

7. In a brake mechanism, the combination with a tightening element; of a supporting member connected with said element; power multiplying planetary gearing in driving relation with said supporting member; a connecting member free of said planetary gearing and connected to said supporting member; a clutch device adapted for engagement with said planetary gearing or said connecting member; and means for driving and shifting said clutch device.

8. In a brake mechanism, the combination with a tightening element; of a supporting member connected with said element; a planetary gearing in driving relation with said supporting member; a connecting member free of said planetary gearing and connected to said supporting member; clutch mechanism adapted for engagement with said planetary gearing or said connecting member, means for driving said clutch element and shifting said clutch element out of driving relation with respect to the connecting member and into driving engagement with the planetary gearing upon a predetermined resistance being encountered by said tightening element.

9. In a brake mechanism, the combination with a tightening element; of a supporting member connected with said element; a planetary gearing in driving relation with said supporting member; a connecting member free of said planetary gearing and connected in driving relation to said supporting member; clutch members associated with said connecting member and said planetary gearing; a clutch device having clutch members adapted for engagement with the clutch members of said connecting members and said planetary gearing; and driving means for driving and shifting said clutch device.

10. In a brake mechanism, the combination with a tightening element; of a housing connected with said tightening element; a connecting element secured to said housing; a plurality of intermeshing gears carried by said housing; a stationary gear independent of said housing arranged to mesh with the gears carried by said housing; and a clutch device arranged for connection to one of the gears in said housing, or to said connecting member.

11. In a brake mechanism, the combination with a tightening element; of a housing connected with said tightening element; a connecting element secured to said housing; a plurality of intermeshing gears carried by said housing; a stationary gear independent of said housing arranged to mesh with the gears carried by said housing; clutch members on one of the gears in said housing, and additional clutch members on said connecting member; a clutch device having means for connection with the clutch members of said gear or said connecting member; and means free of said gear and said connecting means and having operative engagement with said clutch device for driving and shifting the same.

12. In a brake mechanism, the combination with a tightening element; of a plurality of transmitting means cooperating with said tightening element, one of said transmitting means including planetary gearing; clutch members associated with each of said transmitting means; a clutch device having clutch members for engagement with the clutch members of either of said transmitting means, and normally held in one engaging position; and a driving member free of said clutch members, said driving member being provided with inclined driving faces arranged to engage the clutch members of said clutch device in one position, and straight faces adapted to engage said clutch member of said clutch device, in another position thereof.

13. In a brake mechanism, the combination with an operating staff having a ratchet wheel thereon; of a carrier disposed about said staff, and having a lever pivotally mounted thereon, said lever being provided with a pawl for engagement with said ratchet in one position thereof; means for preventing retrograde movement of said staff; a tightening element; a plurality of transmitting means associated with said tightening element, one of said means including power multiplying planetary gearing; a clutch device adapted for connection to either of said transmitting means; and means associated with said staff for driving and shifting said clutch device.

In witness that I claim the foregoing I have hereunto subscribed my name this 26th day of August, 1924.

JOHN F. O'CONNOR.